United States Patent Office 2,905,992
Patented Sept. 29, 1959

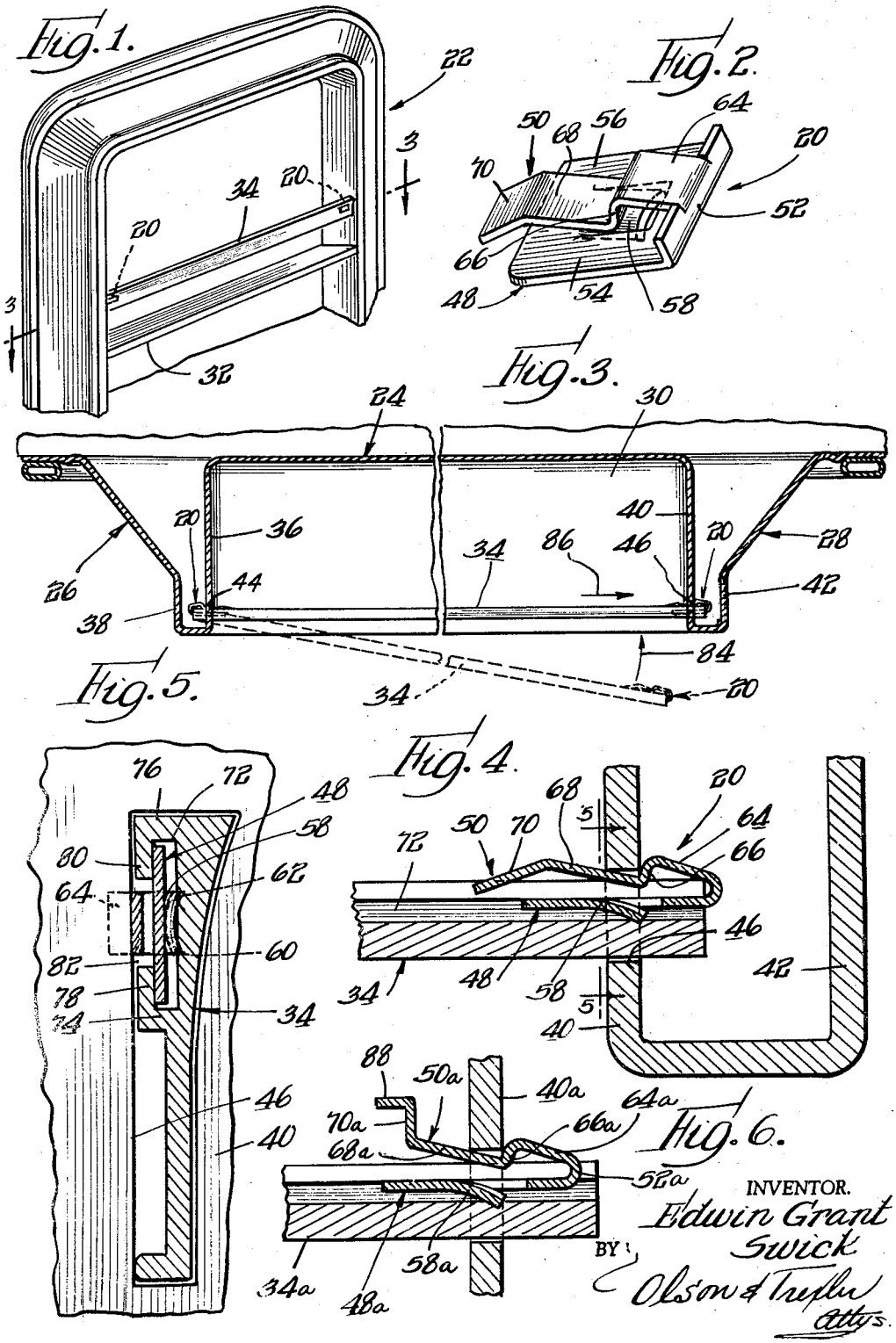

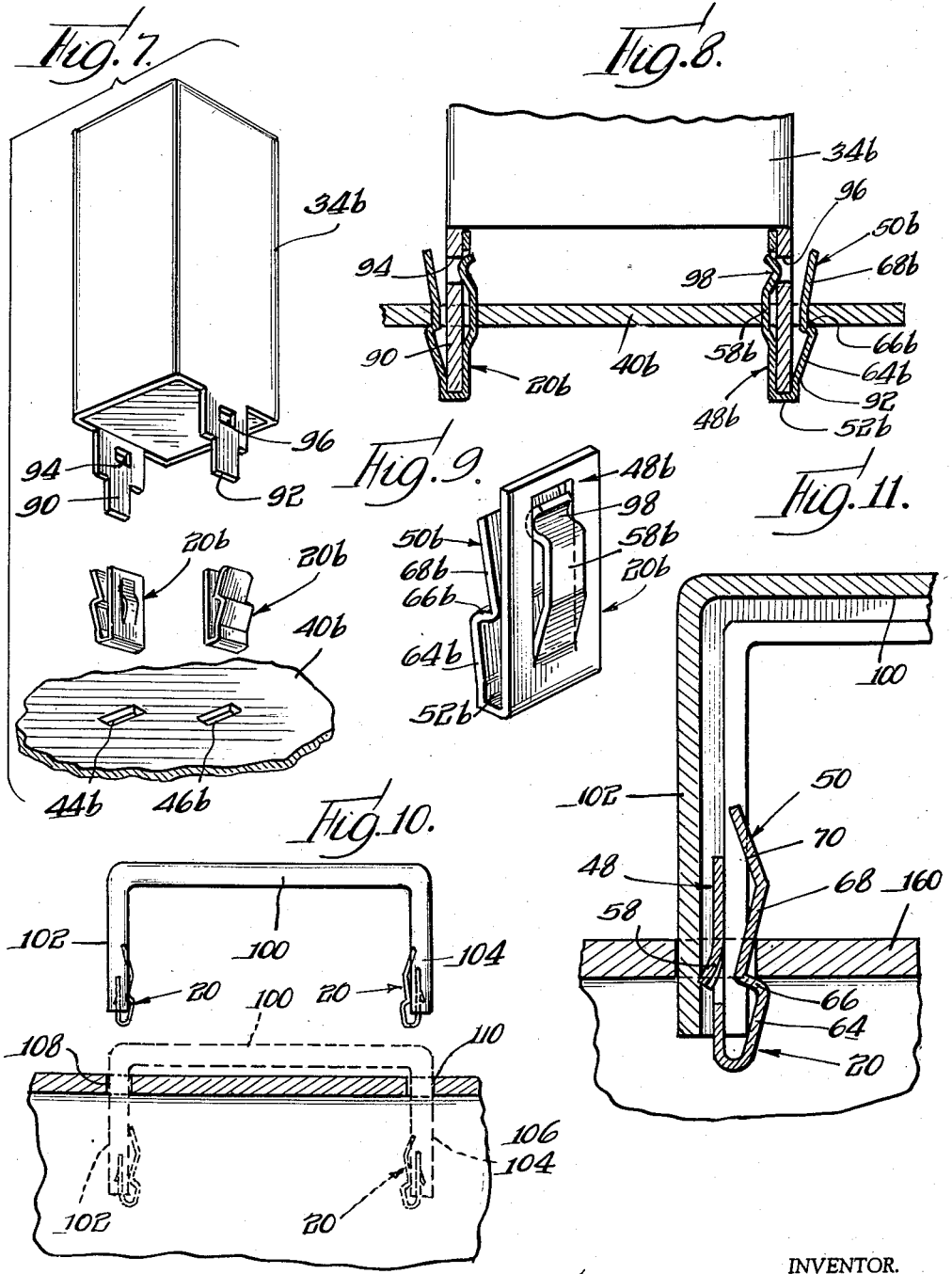

2,905,992
SHEET MATERIAL FASTENER

Edwin Grant Swick, Bartlett, Ill., assignor to Illinois Tool Works, Chicago, Ill., a corporation of Illinois Application February 13, 1958, Serial No. 714,991

7 Claims. (Cl. 24—81)

The present invention relates to a novel fastener, and more particularly to a novel sheet material fastener adapted to connect a plurality of workpieces.

There are numerous structures presently contemplated which include a first apertured workpiece and a second workpiece having a portion which is to be inserted within and connected to the first workpiece. In many of the structures of the type contemplated herein the portion of the second workpiece inserted into the first mentioned workpiece aperture is relatively inaccessible so that fastening means cannot be applied thereto from within or behind the first mentioned workpiece. It is therefore an important object of the present invention to provide a novel one-piece sheet material fastener which may be inserted into a workpiece aperture along with an element or portion of a second workpiece which is to be connected with the first workpiece for retaining the workpieces in assembled relationship.

A more specific object of the present invention is to provide a novel fastener which may be easily slipped into secure assembled relationship with a portion of one workpiece and then easily snapped through an aperture in another workpiece for engaging behind the last mentioned workpiece and retaining the elements in assembled relationship.

Still another object of the present invention is to provide a novel fastener of the above described type which will permit inward axial movement of a workpiece portion into another workpiece aperture while providing means for positively limiting reverse or outward axial movement of said workpiece portion.

Still another object of the present invention is to provide a novel fastener of the above described type which is effective for preventing unauthorized disassembly of a pair of workpieces while at the same time permitting authorized or intentional disassembly of the workpieces without injury to either the workpieces or the fastener.

Other objects and advantages of the present invention will become apparent from the following description and the accompanying drawings wherein:

Fig. 1 is a fragmentary perspective view showing the inside of a refrigerator door or the like which is an example of one structure in which fasteners incorporating features of the present invention may be used;

Fig. 2 is an enlarged perspective view showing a fastener incorporating features of the present invention;

Fig. 3 is an enlarged fragmentary sectional view taken generally along line 3—3 in Fig. 1;

Fig. 4 is a further enlarged fragmentary sectional view similar to Fig. 3 but showing the parts in greater detail;

Fig. 5 is a fragmentary sectional view taken generally along line 5—5 in Fig. 4;

Fig. 6 is a fragmentary sectional view similar to Fig. 4 but shows a modified form of the present invention;

Fig. 7 is an exploded perspective view showing another modified form of the present invention;

Fig. 8 is a fragmentary partial sectional view showing the elements of Fig. 7 in assembled relationship;

Fig. 9 is a perspective view showing the fastener structure of Figs. 7 and 8 in greater detail;

Fig. 10 is an exploded partial sectional view showing an embodiment of the present invention wherein a handle member or the like is to be connected to any desired workpiece or article; and Fig. 11 is an enlarged fragmentary sectional view showing the element of Fig. 10 in assembled relationship.

Referring now more specifically to the drawings wherein like parts are designated by the same numerals throughout the various figures, a fastener 20 constructed in accordance with one embodiment of the present invention is shown in Figs. 1 through 5. While many uses for the fastener 20 may suggest themselves, a refrigerator door structure 22 incorporating the fastener 20 is shown for the purpose of facilitating the disclosure of the present invention. As will be understood, the refrigerator door structure is provided with a liner member 24 at its inner side which liner member includes opposite upstanding marginal portions 26 and 28 which define a recess 30 adapted to receive one or more shelves 32. In order to retain food or any other desired articles on the shelves, a transverse bar or channel member 34, only one of which is shown, is disposed in association with each shelf and extends between the opposite marginal portions 26 and 28 of the liner member. In accordance with the present invention each transverse bar or channel member 34 is connected to the liner member by a pair of the clips or fasteners 20.

As shown best in Fig. 3, the liner member marginal portion 26 has an inner wall section 36 and an outer wall section 38 spaced substantially therefrom. The opposite liner member marginal portion 28 is similarly constructed and includes an inner wall section 40 and an outwardly spaced outer wall section 42. It is to be noted that the inner wall sections 36 and 40 are spaced from each other a distance less than the length of the bar or channel member 34, but the outer wall sections 38 and 42 are spaced from each other a distance which is substantially greater than the length of the bar 34. In addition the inner wall sections 36 and 40 are provided with apertures 44 and 46 which are complementary to and adapted to receive the opposite end of the bar or channel member 34.

The fastener or clip 20 is shown best in Figs. 2, 4 and 5 is constructed so that it may be readily applied to an end of the bar 34 and then easily inserted with the end of the bar into the desired aperture in the liner member. More specifically, the fastener 20 is formed from sheet material which is inherently resilient, and while various sheet materials may be used, spring steel is frequently preferred. The fastener is provided with a generally U-shaped configuration and includes first and second leg portions 48 and 50 joined at the entering end of the fastener by a bight portion 52. It is to be noted that the leg portion 48 is considerably wider than the leg portion 50 and includes sections 54 and 56 which extend laterally beyond opposite side edges of the leg portion 50 for a purpose described fully here and below. A finger 58 is integrally joined with and struck from the central section of the leg portion 48, which finger extends generally in the direction of the bight portion 52 or, in other words, the entering end of the fastener. The finger section 58 is also laterally deflected and is transversely curved to provide projecting corners or teeth 60 and 62 which are adapted to engage the workpiece or bar 34 when the fastener is assembled with the workpiece in the manner described fully below.

The leg portion 50 of the fastener comprises an entering end section 64 integrally joined to the bight portion 52 and spaced from and flaring away from the leg portion 48. The section 64 merges with a shoulder section 66 which extends generally toward the leg portion 48 and provides a workpiece engageable shoulder facing generally away from the entering end of the fastener for the purpose described below. The shoulder section 66 merges with a section 68 which again flares away from the leg portion 48, and in this embodiment the section 68 merges with an inwardly inclined terminal section 70.

The workpiece or bar 34 is provided with a slot or channel 72 which is adapted to receive the leg portion 48 of the fastener 20. As shown best in Fig. 5, the member 34 has opposite side elements 74 and 76 extending along and defining opposite sides of the channel 72, and inwardly directed oppositely disposed flanges 78 and 80 respectively extend from the side elements 74 and 76 and partially cover the bottom of the channel 72. It will be noted that the inner free edges of the flanges 78 and 80 are spaced apart so as to provide a slot 82 having a width greater than the width of the leg portion 50 of the fastener 20. It is further to be noted that the spacing between the bottom of the channel 72 and the under surfaces of the flanges 78 and 80 is greater than the thickness of the sheet material of the leg portion 48 but less than the total distance between the prong and tooth elements 60 and 62 and the inner side surface of the leg portion 48 which faces the leg portion 50.

The bar or channel member 34 is assembled with a pair of the fasteners 20 and the refrigerator door structure in the following manner. The fasteners are first applied to opposite ends of the member 34. This is accomplished quickly and easily and without the aid of any tool merely by forcing the leg portion 48 of each fastener into the channel 72 substantially until the bight portion of each fastener engages the adjacent ends of the flanges 78 and 80 of the chanel member. The fasteners are arranged so that their teeth elements or prongs 60 and 62 engage the bottom of the channel 72. As discussed above, the space between the bottom of the channel 72 and the flanges 78 and 80 is less than the overall thickness of the leg portion 48 and the laterally projecting finger section 58 so that the finger section of each fastener applied to the channel member is resiliently deflected or compressed laterally and the prongs or teeth elements 60 and 62 are urged into aggressive engagement with the channel member so as to restrain removal of the clips or fasteners from the channel member.

After the clips or fasteners are assembled with the member 34, one end of the assembly is inserted into the liner member 24 as shown in broken lines in Fig. 3. More specifically, with the member 34 in the broken line position, an end thereof along with one of the fasteners is inserted through the opening 44 in the wall 36 and advanced toward the left as viewed in this figure substantially until the fastener abuts the wall 38. This provides sufficient clearance to enable the member 34 to be swung inwardly in the direction of the arrow 84 until it is in alignment with the opening 46. Then the member 34 is shifted in the direction of the arrow 86 to the solid line fully assembled position.

It will be appreciated that when an end of the member 34 with a fastener 20 assembled therewith is inserted through a complementary opening such as the openings 44 and 46, the entering end section 64 of the fastener will engage the edge of the opening and cam the leg portion 50 inwardly or toward the leg portion 48 sufficiently to enable the shoulder section 66 to pass through the opening. When such passage has been accomplished, the resiliency of the material causes the shoulder section 66 to spring outwardly to a position for engagement with the back side of the workpiece so as to prevent withdrawal of the fastener and the bar 34. The section 68 serves to engage the wall of the opening so as to prevent the shoulder section from being unduly laterally deflected or bent when an axially outwardly directed force is adapted to the assembly.

Fig. 6 shows an embodiment of the present invention similar to the structure described above as indicated by the application of identical reference numerals with the suffix a added to corresponding elements. This embodiment differs only in that the section 70a of the fastener is directed laterally away from rather than toward the leg portion 48a and terminates in a flange 88. It will be apparent that by manually applying pressure to the flange 88 in a direction extending transversely of the longitudinal axis of the fastener, the leg portion 50a may be laterally collapsed sufficiently to move the shoulder section 66a inwardly and out of engagement with the workpiece so that the fastener and workpiece 34a associated therewith may be removed from the apertured workpiece 40a. It is to be noted that in this embodiment as in the embodiment described above, the shoulder section 66a is in general transverse alignment with the opening formed in the leg portion 48a when the finger element 58a is struck therefrom. Since the opening is as wide as or wider than the leg portion 50a, the opening provides additional clearance permitting lateral collapsing of the shoulder section 66a.

Figs. 7, 8 and 9 show another embodiment of the present invention which is similar to the structures described above as indicated by the application of identical reference numerals with the suffix b added to corresponding elements. This embodiment illustrates the manner in which the present invention may be utilized for connecting the various articles having one or a plurality of projecting apertured elements to an apertured panel. For example, the workpiece 34b may be an intermediate frequency cam which is to be connected to an apertured printed circuit panel 40b. The workpiece 34b is provided with a pair of depending fingers 90 and 92 which respectively have apertures 94 and 96 spaced from their free ends. In this embodiment the fasteners 20b differ from the above described fasteners primarily in the formation of the finger element 58b. More specifically, the finger element 58b is struck from the leg portion 48b so that it is integrally joined with the leg portion adjacent the entering end of the fastener rather than toward the trailing end of the fastener. The finger element 58b extends laterally outwardly from its integral junction with the leg portion 48b and then generally parallel to the leg portion so as to facilitate spring action. The free end of the finger element 58b is formed to provide a laterally inwardly projecting protuberance 98. As shown best in Fig. 8, the protuberance 98 of each fastener is adapted to extend into the aperture of the associated finger element of the workpiece for retaining the workpiece and the fastener in assembled relationship. It will be appreciated that after the fasteners have been assembled with the finger elements 90 and 92, the assemblies may be readily inserted through the openings 44b and 46b until the shoulder sections of the fasteners are snapped beneath the panel 40b.

In Figs. 10 and 11 there is shown another embodiment of the present invention. In this embodiment the fastener may be identical to the fastener shown in Figs. 1 through 5. This embodiment indicates the manner in which fasteners of the present invention may be utilized for connecting a handle member or the like 100 having depending channeled legs 102 and 104 with an apertured workpiece such for example as the cabinet of a radio 106 or the like. The fasteners are applied to the lower ends of the handle legs and the resulting assemblies are inserted through openings 108 and 110 in the top of the cabinet 106 in a manner essentially the same as that discussed above in connection with the assembly of the parts shown in Figs. 1 through 5. In many portable radios it is desirable to have the handle connected with the cabinet in a manner so that the handle may be collapsed as indicated by the broken line position shown in Fig. 10 when not in use or extended as shown in Fig. 11 when the radio is to be carried. The fasteners 20 readily permit the handle to be lowered to its collapsed position since the sections 68 and 70 of the fasteners do not positively prevent the fasteners from passing entirely through the openings in the workpiece or radio cabinet. However, it is to be noted that the outwardly flaring sections 68 of the fasteners will resiliently engage the upper edge of the cabinet 106 in a manner which will retain the handle in the raised position until the handle has been manually pushed downwardly sufficiently to cause the sections 68 of the fasteners to pass entirely through the openings. The sections 70 of the fasteners will serve as cam elements to facilitate re-entry of the holding sections 68 into the openings when the handle is pulled upwardly from the collapsed position.

While the preferred embodiments of the present invention have been shown and described herein, it is obvious that many structural details may be changed without departing from the spirit and scope of the appended claims.

The invention is claimed as follows:

1. A one-piece sheet material fastener for connecting a first workpiece to a second workpiece having an aperture therein adapted to receive an end portion of said first workpiece, said first workpiece having a longitudinally extending channel therein and including oppositely disposed inturned longitudinally extending side flanges overlying and spaced a predetermined distance from a bottom surface of said channel, said flanges defining a restricted longitudinally extending slot of predetermined width therebetween, said fastener comprising first and second opposing generally longitudinally extending and spaced apart leg portions adapted to enter said aperture of the second workpiece, each said leg portion having a free end and an entering end, and a bight portion integrally joining said entering ends of said leg portions, said leg portions being movable axially in a direction directed from the end toward the middle of said first workpiece and into overlapping assembled relationship with said first workpiece by axially inserting said first leg portion into said channel and beneath said flanges so that the bight portion of said fastener extends outwardly, said first leg portion including integral means for engaging said first workpiece to restrain removal of the fastener from said first workpiece in a direction opposite from said first mentioned direction, said second leg portion including transversely projecting shoulder means facing generally away from said entering ends, said second leg having a width less than the width of said first leg portion and also less than said width of the slot to enable said second leg to be laterally collapsed into the slot for laterally collapsing said shoulder means during insertion of the fastener into said second workpiece aperture for positioning the shoulder means for engagement behind said second workpiece to restrain removal of the fastener from the aperture, said second leg portion including an outwardly flared section between its entering end and said shoulder means for facilitating lateral collapsing of the shoulder means during insertion of the fastener into said aperture, and said fastener including means adjacent the entering ends of said leg portions for engaging an end of said first workpiece for limiting movement of the fastener into overlapping relationship with said first workpiece.

2. A one-piece sheet material fastener, as defined in claim 1, wherein said means for restraining removal of the fastener from said workpiece includes a finger element integral with and struck from said first leg portion, said finger element extending from an integral junction with said first leg portion laterally and generally toward said entering ends of the leg portions, and said finger element having a terminal end engageable with said first workpiece and spaced from a side of said first leg portion facing away from the finger element a distance greater than said distance between said flanges of the first workpiece and the bottom surface of said channel.

3. A one-piece sheet material fastener, as defined in claim 2, wherein said finger element is transversely curved and presents opposite corners of a free end thereof for engagement with said first workpiece.

4. A one-piece sheet material fastener, as defined in claim 1, wherein said means engageable with an end of said first workpiece for limiting movement of the fastener into overlapping relationship of said first workpiece comprises a section of said bight portion laterally offset from said second leg portion for engagement with an end of one of said flanges.

5. A one-piece sheet material fastener, as defined in claim 1, wherein said second leg portion includes a section extending from said shoulder means and away from said entering ends for engaging a wall of the second workpiece aperture and positively limiting lateral outward movement of said shoulder means.

6. A one-piece sheet material fastener, as defined in claim 5, wherein said last named section terminates in laterally outwardly offset flange means to which transversely directed pressure may be manually applied for laterally collapsing said shoulder means to permit withdrawal of the fastener from the workpiece aperture.

7. A one-piece sheet material fastener, as defined in claim 5, wherein said last named section terminates in an inwardly inclined portion so as to enable the fastener to be passed entirely through the workpiece aperture and then at least partially withdrawn from the aperture.

References Cited in the file of this patent

UNITED STATES PATENTS

| | | |
|---|---|---|
| 2,148,847 | Wiley | Feb. 28, 1939 |
| 2,295,444 | Woodward | Sept. 8, 1942 |
| 2,389,897 | Davis | Nov. 27, 1945 |
| 2,520,725 | Judd | Aug. 29, 1950 |
| 2,830,345 | Fernberg | Apr. 15, 1958 |

FOREIGN PATENTS

| | | |
|---|---|---|
| 684,098 | Great Britain | Dec. 10, 1952 |